Aug. 30, 1949.  L. L. PATTERSON  2,480,419
CUTTER ASSEMBLY FOR ROTARY PLOWS
Filed May 19, 1945  3 Sheets-Sheet 1

LOUIS L. PATTERSON,
INVENTOR.

BY
ATTORNEY.

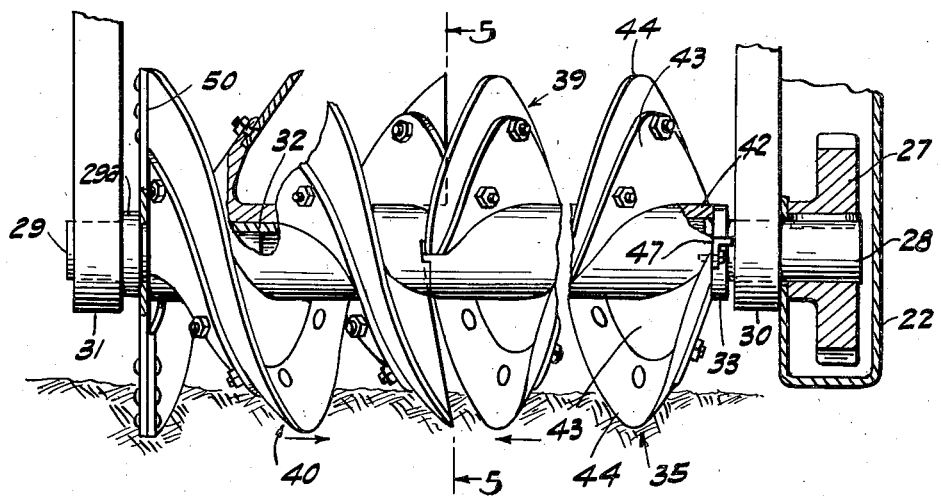
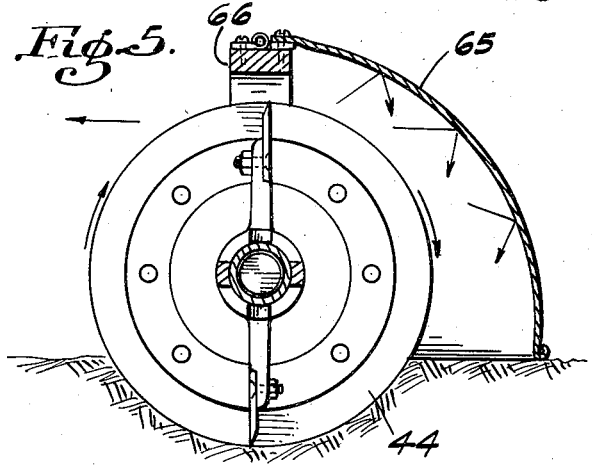
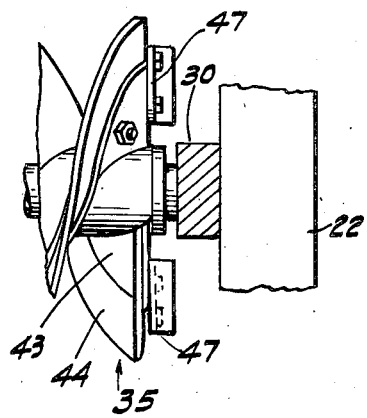
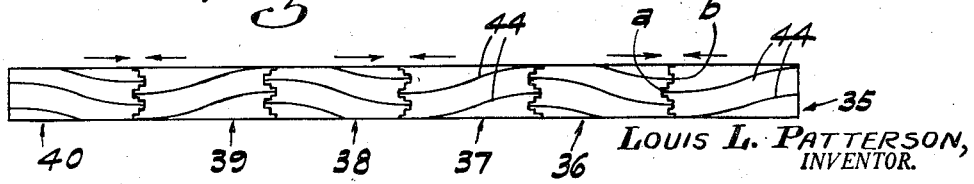

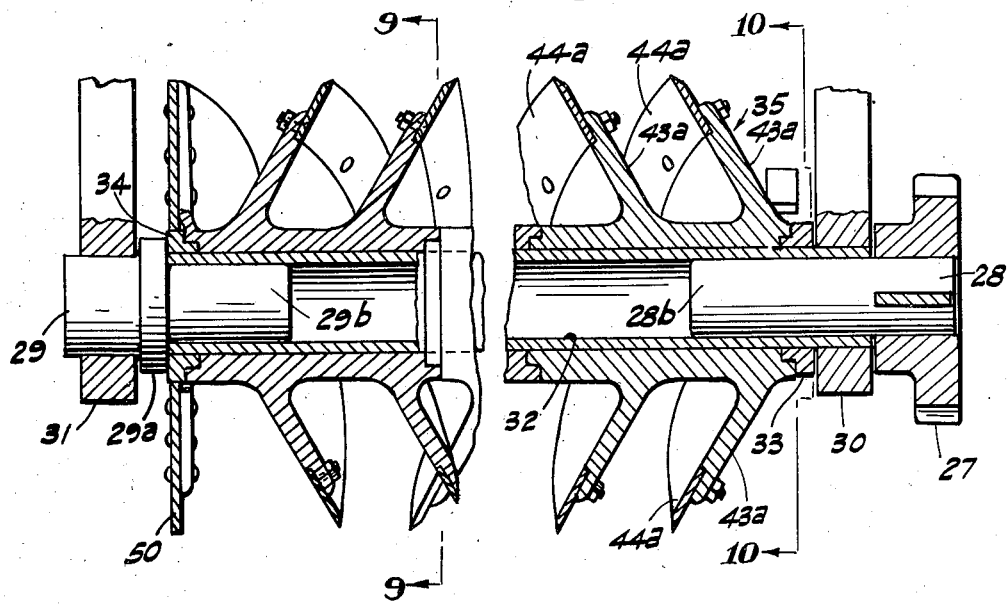
Fig. 8.
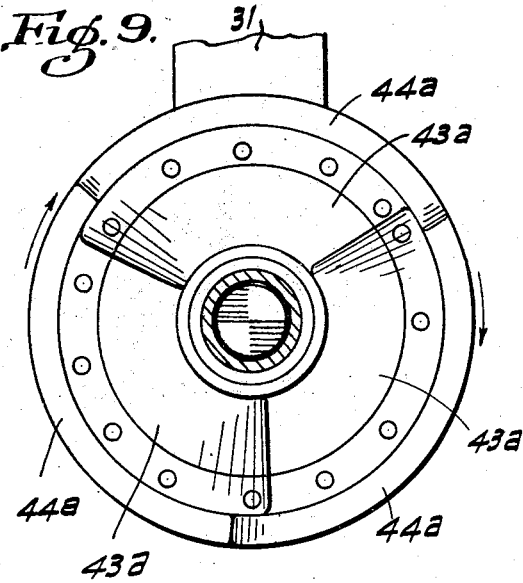
Fig. 9.
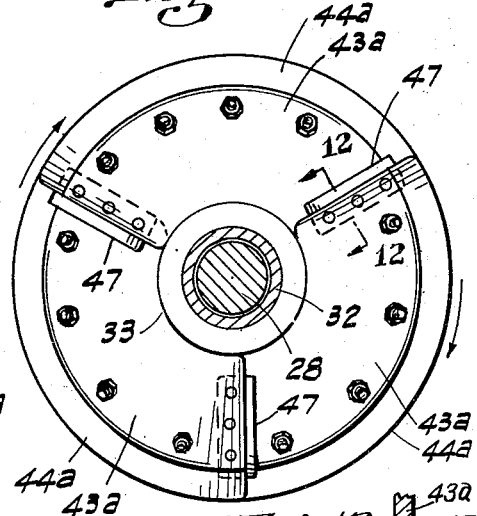
Fig. 10.
Fig. 12.
LOUIS L. PATTERSON,
INVENTOR.
BY [signature] ATTORNEY.
Fig. 11.
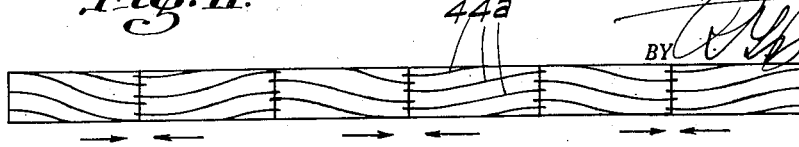

Patented Aug. 30, 1949

2,480,419

UNITED STATES PATENT OFFICE 2,480,419

CUTTER ASSEMBLY FOR ROTARY PLOWS

Louis L. Patterson, Los Angeles, Calif., assignor to Automatic Screw Machine Co., Los Angeles, Calif.

Application May 19, 1945, Serial No. 594,712

2 Claims. (Cl. 97—219)

This invention relates to a power driven rotary plow structure.

More specifically speaking, the invention pertains so that type of rotary plow which is embodied in an agricultural implement adapted to be trailed by a self-propelled tractor provided with an engine which not only propels the tractor and the implement but which is also connectable with the rotary plow structure of the latter to rotate said plow structure as the machine advances over the surface of the ground being cultivated and/or tilled in preparation for planting.

Hitherto, in mechanism of the above stated kind difficulty has been encountered by reason of the side thrust which has resulted from the rotation of the plow blades, when the latter are arranged in a spiral manner around the power driven shaft, such side thrust rendering the machine very unstable in its operation and tending to steer the trailed vehicle completely off its course.

With a view to overcoming the above stated defects, it is one of the objects of this invention to provide, in that type of cultivators wherein spiral plow blades are mounted upon a power driven shaft structure, such an arrangement of the plow blades that all tendency to a "draft" toward one side or the other of the machine will be eliminated by reason of the endwise thrust by the plow blades carried by certain portions of the shaft structure being counteracted by an oppositely directed thrust produced by the plow blades mounted on other portions of said shaft structure.

Another object is to provide, as a new article of manufacture, sets of sleeve members having integral with or secured to them spiral plow blades so arranged that said sleeve members may be substituted for the blade carrying members of rotary plows now on the market, thereby overcoming the side thrust defect which now exists in some rotary plows.

Still another object is to provide an improved mechanical means to clear away weeds or debris that may tend to wind around the rotary plow structure and thereby obstruct the efficient operation of the machine.

It is also an object of the present invention to provide, in conjunction with the spiral rotary plow members assembled in such a manner as to avoid side thrust, such a formation and positioning of the assembled blade-carrying members that, as to contiguous blade-carrying members, that the trailing edge of every member overlaps or interengages with the leading edge of its companion, thereby preventing any unstirred strips of soil remaining behind the advancing machine.

Yet another object is to provide a mechanical cultivator which combines with the aforementioned thrust equalizing feature a smooth plowing feature so that no objectionable furrow or ridges are formed in the soil as the machine advances.

A further and more specific object is to provide, in a rotary plow blade assembly, between adjacent sections of the assembly, an improved joint structure or connecting means which cooperates in a more advantageous manner with the plow blades of the assembly, so that in assembling adjacent sections their blade portions are automatically properly spaced circumferentially about the axis of rotation of the assembly.

Other objects, features and advantages of invention will hereinafter appear.

Referring to the accompanying drawings, which illustrate what at present are considered to be preferred embodiments of the invention, Fig. 1 is a plan view of the preferred embodiment, parts being broken away to contract the view and to show underlying structures.

Fig. 4 is an enlarged fragmentary rear elevation of the cutter assembly and adjacent mounting sections illustrating the relation of the blades of contiguous sections to each other.

Fig. 5 is a section taken on line 5—5 of Fig. 4. In the view is included a section of the conventional shield cover.

Fig. 6 is a fragmentary elevation showing the arrangement of the weed-removing wipers.

Fig. 7 is a developed view of the cutter assembly.

Fig. 8 is a fragmentary longitudinal midsection partly in rear elevation of an alternate embodiment of the cutter assembly, this view being somewhat similar to Fig. 4.

Figure 1:
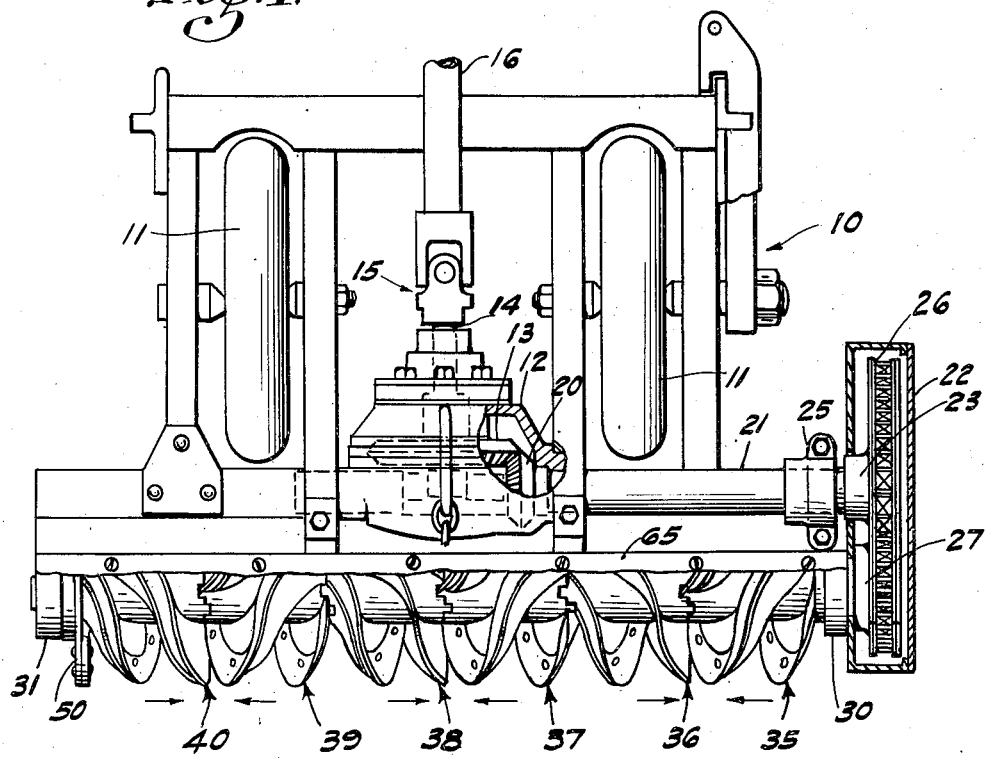

Figs. 9 and 10 are sections taken on lines 9—9 and 10—10, respectively, of Fig. 8.

Fig. 11 is a developed view of the rotary cutter assembly shown in Fig. 8.

Fig. 12 is a section taken on line 12—12 of Fig. 10.

Referring in detail to the drawings and describing first the embodiment of the invention illustrated in Figs. 1 to 7, the implement frame 10 has its front portion supported by a pair of ground wheels 11 and is designed for being connected with a tractor by any suitable draft appliance.

Upon the midwidth, rear part of said frame 10 is mounted a gear housing 12 which contains a master or primary gear 13 fixed to a shaft 14, this gear shaft being connected by a universal joint structure 15 to the power transmission shaft 16 which, in turn, is operatively connectable with the take-off shaft of the tractor which trails the implement.

Returning to the primary gear 13, this gear is shown as being of the bevel type and in mesh with a driven bevel gear 20 fixed to a horizontal shaft 21 which extends into a housing 22, sprocket wheel 23 being secured to said shaft 21 within this housing. A bearing member 25 supports the outer end of said shaft 21.

A sprocket chain 26 passes over wheel 23 and conveys power therefrom to a driven sprocket wheel 27 also within housing 22, the latter wheel being fixed to the stub shaft 28 at the right hand side of the machine as viewed in Figs. 4 and 8, there being at the opposite side of the machine a corresponding stub shaft 29, the latter stub shaft having a diametrically enlarged intermediate portion 29a.

The stub shafts 28 and 29 are respectively supported by suitable bearing means 30 and 31. Said stub shafts have inner end portions 28b and 29b, see Fig. 8, fitting tightly within and being welded or otherwise secured to the tubular sleeve 32. Around this sleeve at the inner side of said bearing means 30 is shown a spacing collar 33, and around the sleeve at the inner side of the enlargement 29a is shown a spacing collar 34. Said sleeve 32 extends between the enlargement 29a on the left to the sprocket 27 on the right and has a pressed fit within the series of hollow blade-carrying cutter sections designated from right to left as 35, 36, 37, 38, 39 and 40.

Describing next the right hand cutter section 35, said section comprises a sleeve portion 42 having a pair of spiral fins 43 cast integral therewith to each end of which is bolted a spiral cutting blade 44 having a cutting edge all portions of which are located radially beyond the outer edge of the fin which support it. The two fins shown cooperate to form a double spiral, said fins being of equal spirality and extending along parallel, diametrically opposite lines as additionally illustrated in the developed surface shown in Fig. 7.

Figure 2:
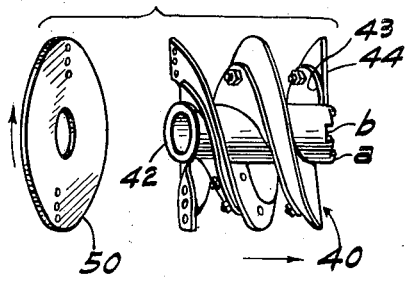
Fig. 2 is an exploded perspective view of the thrust section at the left end of the cutter series as seen in Fig. 1, the cutter disk being included in the view.
Figure 3:
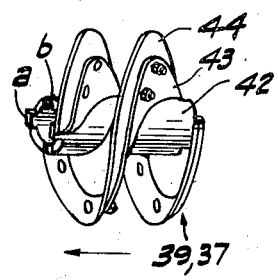
Fig. 3 is a perspective view of a typical intermediate cutter section.

The right hand end of said sleeve portion 42, as seen in Figs. 4, 6 and 7, has a squarely cut flat end portion which abuts the peripheral portion of the collar 33, while the opposite end of said sleeve portion 42, as shown in Figs. 1 and 7, has a mortise and tenon fit in relation to the next adjacent cutter section 36 which it abuts. In Figs. 2 and 3, two of the hub portions which are provided at the ends of contiguous plow blade-carrying sleeves are shown facing each other, each being provided with mortise and tenon joint portions a and b, the joint portions of each hub portion being fittable into those of the other.

In order to insure that the rotatable plow blade assembly acts upon the entire swath of earth being cultivated, the attaching edges of the adjacent end portions of contiguous blades in the assembly, though they do not contact each other, are in an overlapping relation as indicated at joint portions a and b in Fig. 7. Said overlapping blade end portions are equally spaced apart, and each of them extends to the end of the midwidth of the tenon of the plow section which supports it, or at least past the mid-depth portion thereof.

In Fig. 5 it will be seen that the typical fins and cooperating plow blades are disposed diametrically opposite to each other, so that when the plow section 35 is joined to the section 36, as shown in Fig. 7, the ends of the adjacent opposed plow blades will be ninety degrees apart.

From an inspection of Fig. 7 it will be seen at the various a and b designations that the same is true of the various plow blade sections leftward of this section.

To the outer side of each fin and blade of end section 35 is secured an angular wiper bracket 47, the purpose of which is to prevent weeds from winding upon that end of the cutter sections and tending to obstruct the operation of the cutters. These weed wipers are shown only in Figs. 4, 6, 8, 10 and 12. In the latter view one limb 47a of the bracket is shown attached to the blade 43a so as to position its other limb 43b in an overlying relation to one or the other of the end bearings of the plow blade assembly to prevent weeds from winding in between the inner end of such bearing and the adjacent blade-carrying part.

Describing more in detail plow blade sections 35 and 36, these sections are alike except that section 35 has one end only provided with a mortise and tenon joint whereas section 36 has both of its ends provided therewith. As to sections 37—39, these sections are the same in pattern as section 36, as for example the section shown in Fig. 3. As to section 40, this section is the same pattern, except that as shown in Figs. 1, 2 and 4, it has a flat cutter disk 50 secured concentrically to it, said disk occupying a plane extending at a right angle to the axis of the cutter assembly and having a diameter substantially equal to the diameter which is common to the various cutter blades.

Sections 40, 38 and 36 are thrust sections and sections 39, 37 and 35 are equalizing sections. In order that the thrust produced by sections 40, 38, 36 can be equalized, sections 39, 37 and 35 have their plow blades wound around the axis of the assembly in a direction reverse to that of the remaining sections.

As shown in section in Fig. 5 and partly shown in plan in Fig. 1, over the rotary thrust and equalizer sections is mounted a conventional shield or ground leveling guard 65 which has its upper edge portion hinged to a transverse supporting member 66 carried by the implement frame in a superjacent relation to said thrust and equalizer sections.

Describing the alternate embodiment of the invention as shown in Figs. 8 to 12, the main difference is that in said embodiment a triple instead of a double spiral fin and blade structure is shown for each of the rotary thrust and equalizer sections with a result that the blade-carrying fins of each section are 60 instead of 90 degrees apart. Corresponding parts of the modified structure are lettered in the same manner except that the letter a is affixed to the fin and blade structures. In the developed view shown in Fig. 11 the triple character and equal circumferential spacing of the blades and fins is further illustrated. The arrows below said view indicate the manner in which the various equalizing sections offset the thrust produced by the thrust sections. Also a different structure has been substituted for the mortise and tenon joints shown in Figs. 1, 2, 3, 4, 6 and 7 adjacent rotary cutter sections.

What is claimed is:

1. In a plow having a rotary shaft, a plurality of separable plow sections mounted in aligned positions on the shaft and including a plurality of sections intermediate a pair of end sections, each of said intermediate sections comprising a sleeve fitted axially on said shaft and having mortise and tenon formations at each end, a plurality of parallel ribs fixed on the sleeve and spiralling in one direction, a spiral plow blade fixed to and projecting radially outward of each rib, the opposite ends of each rib extending onto the projecting tenons at the ends of the sleeve, contiguous sections having their mortise and tenon formations in interlocking relation and the ribs and blades reversely spiraled, with the adjacent ends of the ribs and blades circumferentially spaced and overlapping axially of the plow assembly.

2. A plow as claimed in claim 1 wherein the end edges of each of said rib and blade assemblies are in co-planar relation radially of the axis of the sleeve and shaft.

LOUIS L. PATTERSON.

REFERENCES CITED

The following references are of record in the file of this patent:

UNITED STATES PATENTS

| Number | Name | Date |
| --- | --- | --- |
| 191,332 | Freeborn | May 29, 1877 |
| 1,472,565 | Manning | Oct. 30, 1923 |
| 1,562,079 | Chapin | Nov. 17, 1925 |
| 1,836,984 | Newsom | Dec. 15, 1931 |
| 2,030,034 | Newsom | Feb. 4, 1936 |
| 2,342,030 | Bagan | Feb. 15, 1944 |
| 2,403,271 | Erickson | July 2, 1946 |
| 2,408,361 | Bagan | Oct. 1, 1946 |

FOREIGN PATENTS

| Number | Country | Date |
| --- | --- | --- |
| 250,363 | Germany | Aug. 28, 1912 |